United States Patent [19]

Freeman

[11] Patent Number: 4,847,698
[45] Date of Patent: Jul. 11, 1989

[54] INTERACTIVE TELEVISION SYSTEM FOR PROVIDING FULL MOTION SYNCHED COMPATIBLE AUDIO/VISUAL DISPLAYS

[75] Inventor: Michael J. Freeman, Sands Point, N.Y.

[73] Assignee: Actv, Inc., Port Washington, N.Y.

[21] Appl. No.: 74,138

[22] Filed: Jul. 16, 1987

[51] Int. Cl.[4] .......................... H04N 5/76; H04N 7/173
[52] U.S. Cl. ....................................... 358/343; 358/86; 358/102; 358/143; 434/307; 434/309; 434/323
[58] Field of Search ................. 358/343, 335, 86, 142, 358/102, 143, 145; 352/5; 434/307, 308, 318, 319, 321, 323, 309; 360/19.1

[56] References Cited

U.S. PATENT DOCUMENTS

| | | | |
|---|---|---|---|
| 4,305,131 | 12/1981 | Best | 358/102 |
| 4,333,152 | 6/1982 | Best | 352/102 |
| 4,569,026 | 2/1986 | Best | 358/102 |

Primary Examiner—L. T. Hix
Assistant Examiner—D. Rutledge
Attorney, Agent, or Firm—Bryan, Cave, McPheeters & McRoberts

[57] ABSTRACT

An interactive television system (10, 10a) for providing full motion synched compatible audio visual displays based on dynamic user selection (26) of a plurality of syllable synched compatible audio choices for a common full motion video frame presentation provided over a common television channel. Two or more audio channels are synched to a common video channel, with the video being compatible will all audio channels. The interactive programming is stored on video cassette (12, 12a) or other storage media and the audio channels are either multiplexed into the video line or the existing audio channels and are provided to a control module (14, 14a) which demultiplexes the signal (16, 16a) and ultimately combines the user selected audio signal with the video in an RF modulator (20) under computer control (18, 22, 24, 26) to provide the interactive display.

29 Claims, 6 Drawing Sheets

4,847,698

INTERACTIVE TELEVISION SYSTEM FOR PROVIDING FULL MOTION SYNCHED COMPATIBLE AUDIO/VISUAL DISPLAYS

CROSS-REFERENCE TO RELATED APPLICATIONS

This application is related to the commonly owned copending U.S. patent applications of applicant herein entitled "Interactive Television System For Providing Full Motion Synched Compatible Audio/Visual Displays From Transmitted Television Signals", and "Method for Providing An Interactive Full Motion Synched Compatible Audio/Visual Television Display", respectively, both of which are filed contemporaneously herewith, and the contents of which are specifically incorporated by reference herein.

TECHNICAL FIELD

The present invention relates to interactive television systems and particularly to such systems in which an interactive full motion synched compatible audio/visual television display presentation is provided based on dynamic user selection of a plurality of syllable synched compatible audio choices for a common full motion, video frame presentation in a multiple video frame common full motion video display provided over a common television channel.

BACKGROUND ART

Real time conversational student response teaching apparatus are known, such as described in U.S. Pat. Nos. 3,947,972 and 4,078,316. In addition, multiple choice student response systems are well known such as exemplified by the systems, disclosed in U.S. Pat. Nos. 2,921,385; 3,020,360; 2,826,828; 3,623,238; 3,546,791; 3,273,260; 3,665,615; 3,245,147; 3,284,923; 3,538,621; 3,477,144; 3,708,891; 3,235,536; 2,777,901; 2,908,767; 3,774,316; 3,194,895; 3,484,950; 3,343,280; and 3,763,577, by way of example. None of these systems, however, has been employed in connection with an interactive television system in which there is dynamic user selection of a plurality of synched compatible audio presentations for a common full motion video presentation for providing a common full motion multiple video frame television display over a common television channel, nor in such an interactive system in which a plurality of recipients of the common television channel may independently select different syllable synched compatible audio presentations for the common full motion video presentation to provide different interactive full motion audio/visual television displays. Moreover, although prior art subscription cable television systems are well known in which a plurality of unrelated television programs, under control of a computer, are transmitted over a common television channel for selection by individual subscribers, such as disclosed in U.S. Pat. Nos. 3,814,891 and 3,759,225, such systems are also not interactive television systems capable of providing dynamic user selection of a plurality of syllable synched compatible audio presentations for a common full motion video presentation so as to provide a common full motion multiple video frame television display over a common television channel. Similarly, although interactive television systems per se are known, such as described in applicant's prior U.S. Pat. Nos. 4,264,925; 4,264,924; 4,507,680; and 4,573,072, and in U.S. Pat. Nos. 4,305,131 and 4,331,974 by way of example, none of these interactive television systems employs the aforementioned dynamic user selection of syllable synched compatible audio signals for a common video channel to provide a full motion audio/visual television display. This is so despite the prior art use of multiple audio signal in connection with a television picture, such as disclosed in U.S. Pat. Nos. 2,612,553; 3,245,157; 4,555,730; 3,221,098; 4,665,431; 3,440,342; 3,860,745; 3,387,084; such as for providing stereo, such as disclosed in U.S. Pat. Nos. 4,646,150; 4,603,349 and 4,621,282; or the prior art use of program substitution, such as disclosed in U.S. Pat. No. 3,366,731.

By utilizing applicant's unique system and method, however, interactive television may not only be provided using conventional videotape equipment or conventional broadcast or cable television, but previously recorded non-interactive movies or television programs can readily be rerecorded to provide an interactive television program. These advantages are not believed to be present in the prior art known to applicant.

DISCLOSURE OF THE INVENTION

The present invention relates to a television system for providing an interactive full motion synched compatible audio/visual television display presentation based on dynamic user selection of a plurality of choices for a multiple video frame common full motion television display. The television system includes means, such as a conventional VCR or video disc, for providing a common full motion multiple video frame audio/visual television display comprising a common interrogatory message and a plurality of user selectable choices related to the common interrogatory message, and a plurality of syllable synched user selectable audio presentations corresponding to the user selectable common interrogatory message related choices and which are compatible with a subsequent common full motion video frame subsequent to the common interrogatory message containing video frame. The audio presentations comprise responsive messages to the common interrogatory message and have a different word content but, substantially identical syllable content portions for providing a plurality of dynamic user selectable synched different responsive audio messages to the previous video frame common interrogatory message in the common full motion television display. Thus, two or more audio channels are synched to a common video channel in providing the full motion interactive television display over the common television channel. The audio may be provided as a multiplexed signal multiplexed into the video signal or multiplexed into an existing audio channel or may be a stereo type signal. In addition to providing such an interactive program for a single user from a storage media, such as a video cassette or video disc, the program may be broadcast or sent over cable television to a plurality of users who may then independently dynamically make their own choice of the audio/visual television display to be provided. The dynamic selection may employ a plurality of selectors, such as buttons, which are actually greater in number than the number of provided audio choices, whereby greater flexibility is provided. For example, one or two or more of the buttons can refer to a generically wrong answer while only one of the buttons can refer to a specific right answer. These buttons and combinations of buttons can vary with each question.

In recording the interactive television programming to be provided, the method employed involves recording a first choice audio/visual television presentation, such as the most likely or correct one of a plurality of audio channel choices, and then subsequently recording the second and other subsequent user selectable audio choices over the first choice on all but one of the other audio channels by syllable synching these subsequent audio choices to the first recorded choice, such as by changing only certain key words in the subsequent responsive messages being recorded. The recorded audio in each instance is syllable synched and compatible with the mouth movements of an animated character, such as a puppet or human or cartoon animation, in the common video scene in which the audio responsive message will be provided in a full motion and full resolution audio/visual television display. Side shots, cut aways, reaction shots etc., may also be used to provide the compatible syllable synched television display. Previously recorded television programs or movies can also be used as a source for interactive programming by selecting scenes from these shows lending themselves to syllable synching of different choices and rerecording these programs to insert the interactive audio portions of the programming.

BEST MODE FOR CARRYING OUT THE INVENTION

Figure 1:
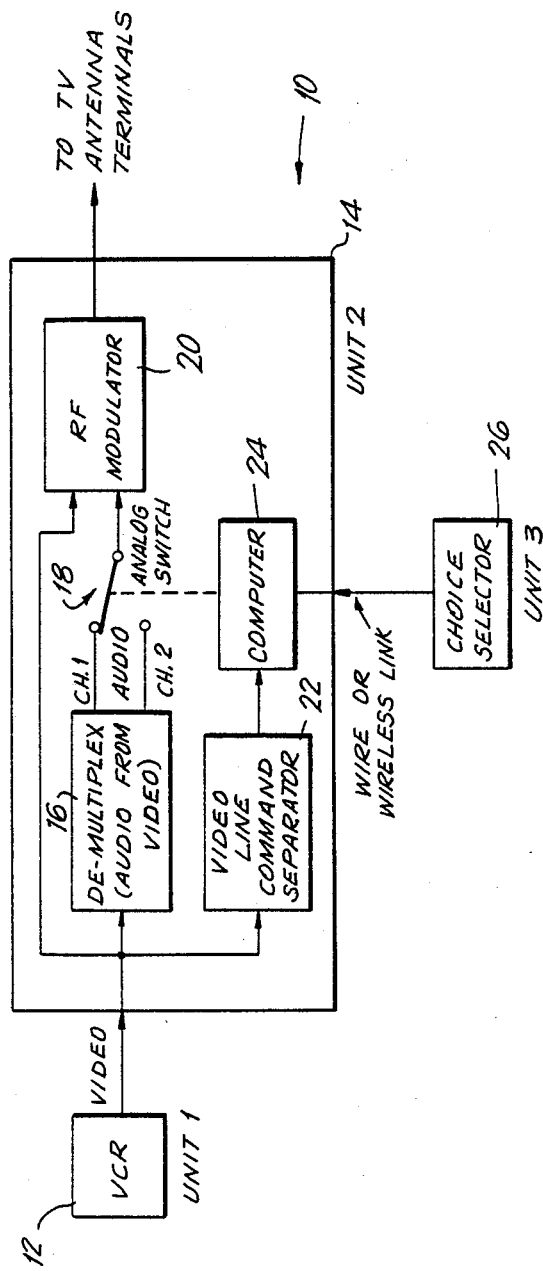
FIG. 1 is a block diagram of a VCR based television system in accordance with the present invention in which two or more audio channels are multiplexed into the video line.
Figure 2:
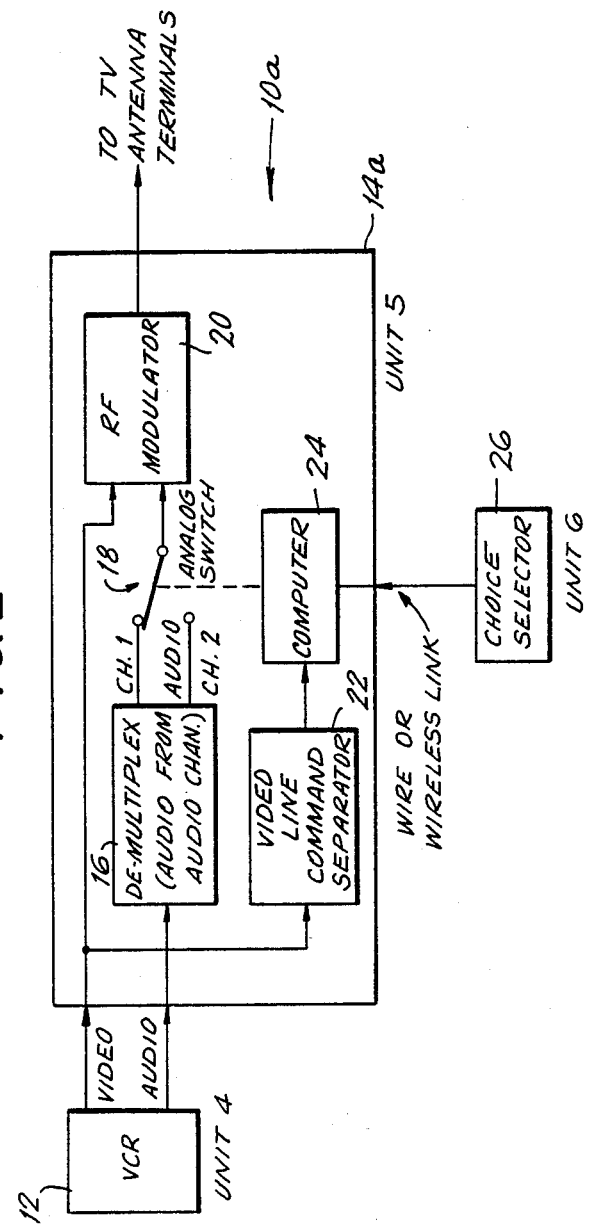
FIG. 2 is a block diagram, similar to FIG. 1, in which two or more audio channels are multiplexed into the existing audio channel.

Referring now to the drawings in detail, the present invention is a system and method for providing interactive television by using conventional video recording equipment or conventional broadcast or cable television. FIGS. 1 and 2 show interactive television systems in accordance with the present invention in which a conventional VCR by way of example, is used as the source of the interactive programming in accordance with the present invention, and FIGS. 3-6 show interactive systems in which a conventional broadcast or cable television is used as the source of the interactive programming in accordance with the present invention. Basically, as will be described in greater detail hereinafter, the interactive programming of the present invention is provided by synching two or more audio channels to a common video channel, with the video and audio being carefully programmed so that the video is compatible with all audio channels. The audio channels each contain syllable synched portions or interactive branches so as to provide different syllable synched responsive messages to a common interrogatory message video presentation using a common video presentation containing animated character mouth movements with which the different syllable synched audio portions are compatible. In this manner, from the viewer's point of view, the television programming appears totally interactive in providing a full motion audio/visual television presentation.

Different approaches for providing the interactive programming of the present invention will be described with reference to FIGS. 1-6. In each of these approaches, preferably dynamic user selection is provided such as by using a plurality of selector buttons, or a joystick by way of example, in which each button or selector can be dynamically assigned to any audio track for each question or interrogatory message during the interactive programming presentation. For example, if there were three button selectors and two audio tracks or channels, for a given question, by way of example, channel 1 could be assigned to button 1 and channel 2 could be assigned to both buttons 2 and 3. Thus, if the user selected button 2 or 3 in this example he would hear what is on audio channel 2. Similarly, in such a three button, two channel arrangement, buttons 1 and 2 could be dynamically assigned to audio channel 1 and button 3 to audio channel 2 for a given question, or buttons 1 and 3 could be assigned to audio channel 2 and button 2 to audio channel 1 for a given question. Such an arrangement in which dynamic user or button selection is provided provides greater variability of the questions and answers and enables a more efficient use of the audio channels.

Referring now to FIG. 1, an interactive television system 10 in accordance with the present invention is shown in which the preferred interactive programming is stored on a conventional video cassette 12 or video disc or other storage media, and two or more audio channels containing the presently preferred syllable synched audio signals are conventionally multiplexed into the video line. Any conventional technique for multiplexing the audio into the video line may be employed such as pulse amplitude modulation, pulse duration modulation or pulse code modulation or digitizing. In the pulse amplitude modulation approach, a sample of the audio channel is inserted into either the front porch area, the back porch area, both areas, or into the active portion of the video line. In the pulse duration modulation approach, a pulse, whose duration is proportional to the signal at sampling time, is inserted into the front porch, back porch or active video portions of the video line. In the digitizing or pulse code modulation approach, the audio is digitized and the coded sample is then placed into the front porch and back porch area and/or the active portion of the video line. In the example of FIG. 1, the interactive program with the encoded audio is played back through a conventional VCR 12, into the control module 14. The control module 14 contains a conventional demultiplexer 16 which conventionally extracts the presently preferred audio signal from the video signal and provides it to a conventional analog switch 18. The video passes through to a conventional RF modulator 20 with the signal also being passed to a video line command separator 22, to be described in greater detail hereinafter, which, together with computer 24 and the dynamic choice selector 26, determine the selected user audio choice to be combined with the video in RF modulator 20 to provide the presently preferred interactive full motion audio/visual television display. The selected audio channel as well as the video provided from the VCR 12 are preferably conventionally up modulated to, for example, channel 3 or 4, by RF modulator 20, with the interactive programming then being displayed or viewed on a conventional television receiver (not shown). By putting the presently preferred audio tracks into the video portion of the signal in the embodiment of FIG. 1, a viewer who does not have a control module 14 to decode the presently preferred audio signal would be able to hear a different non-interactive audio channel, such as one provided via the regular audio signal.

Referring now to FIG. 2, the system 10a is basically the same as the interactive television system 10 previously described with reference to FIG. 1, with like reference numerals being used for like functioning components, with the exception that in this instance the two or more presently preferred audio channels containing the preferred syllable synched compatible audio signals are multiplexed into the existing audio channel, or placed in available channels if the VCR 12a is a conventional stereo VCR. Thus, the conventional demultiplexer 16a in control module 14a conventionally demultiplexes the audio channel and provides the demultiplixed signal to the conventional analog switch 18 with the video still being passed to the conventional RF modulator 20 along with the selected audio from switch 18. The balance of the operation is the same as previously described with respect to FIG. 1.

Figure 3:
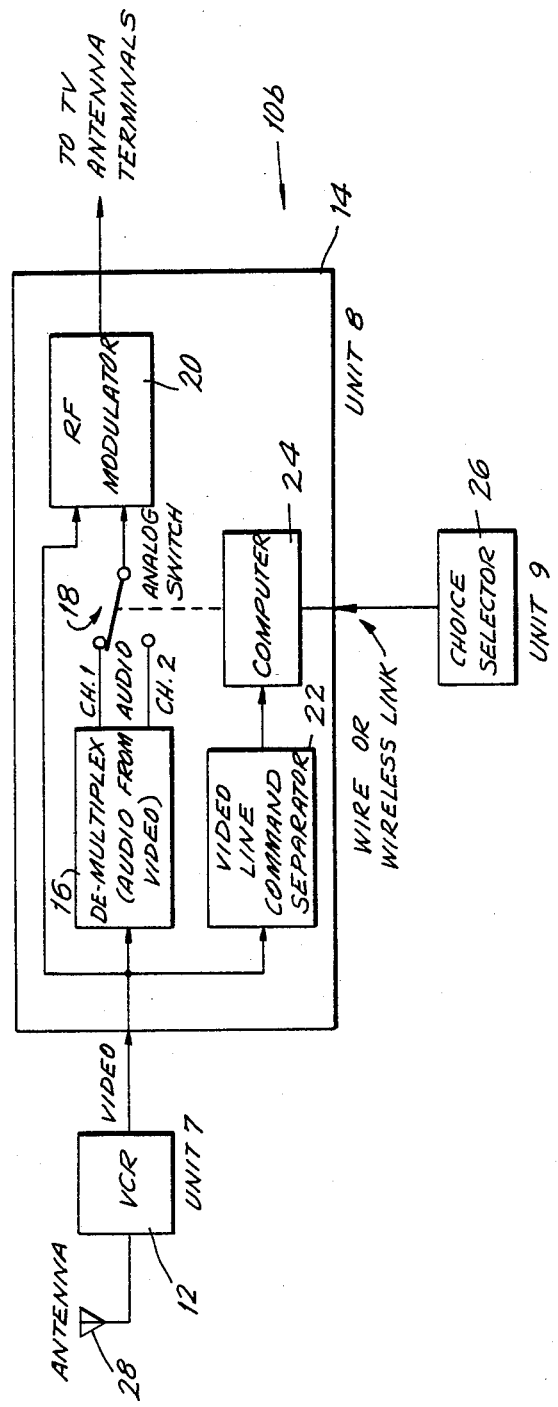
FIG. 3 is a block diagram similar to FIG. 1 in which the television signal is taken off the air, with a VCR front-end and the received audio multiplexed into the received video signal.

Referring now to FIG. 3, the operation of the interactive television system 10b is preferably identical to that previously described with reference to FIG. 1 with the exception that the source of the presently preferred interactive television programming is a conventional television type broadcast or cable television transmission over the air in which the presently preferred audio signals have been multiplexed into the video signal at the head end and transmitted in this format, with the conventional VCR 12 being used as a tuner for the television signal received via the conventional TV antenna or cable 28. Preferably, in the embodiment of FIG. 3, audio on the normal television audio channel is chosen to be compatible with the video so as to permit viewers who do not own a VCR 12 or have a control module 14 to watch and listen to the program in a non-interactive manner.

Figure 4:
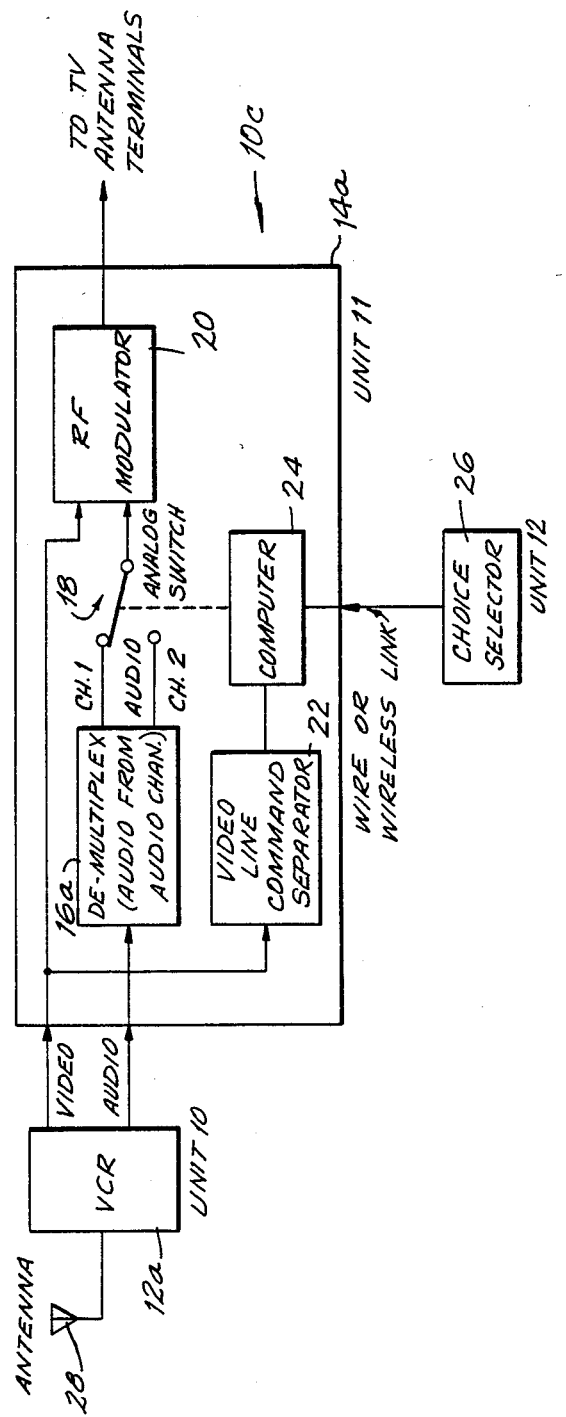
FIG. 4 is a block diagram similar to FIG. 2 in which the television signal is taken off the air, with a VCR front-end and the received audio multiplexed into the existing audio channel.

Referring now to FIG. 4, the operation of the interactive television system 10c is preferably identical to that previously described with reference to FIG. 2 with the exception that the source of the presently preferred interactive television programming is a conventional television type broadcast or cable television transmission over the air in which the presently preferred audio signals have been multiplexed into the existing audio channel, or placed in available channels if it is a stereo broadcast, at the head end and transmitted in this format, with the conventional VCR 12a being used as a tuner for the television signal received via the conventional TV antenna or cable 28. In this instance, however, as contrasted with the embodiment of FIG. 3, since the existing audio channel (or channels for stereo) has already been utilized, non-interactive programming cannot be available at the same time.

Figure 5:
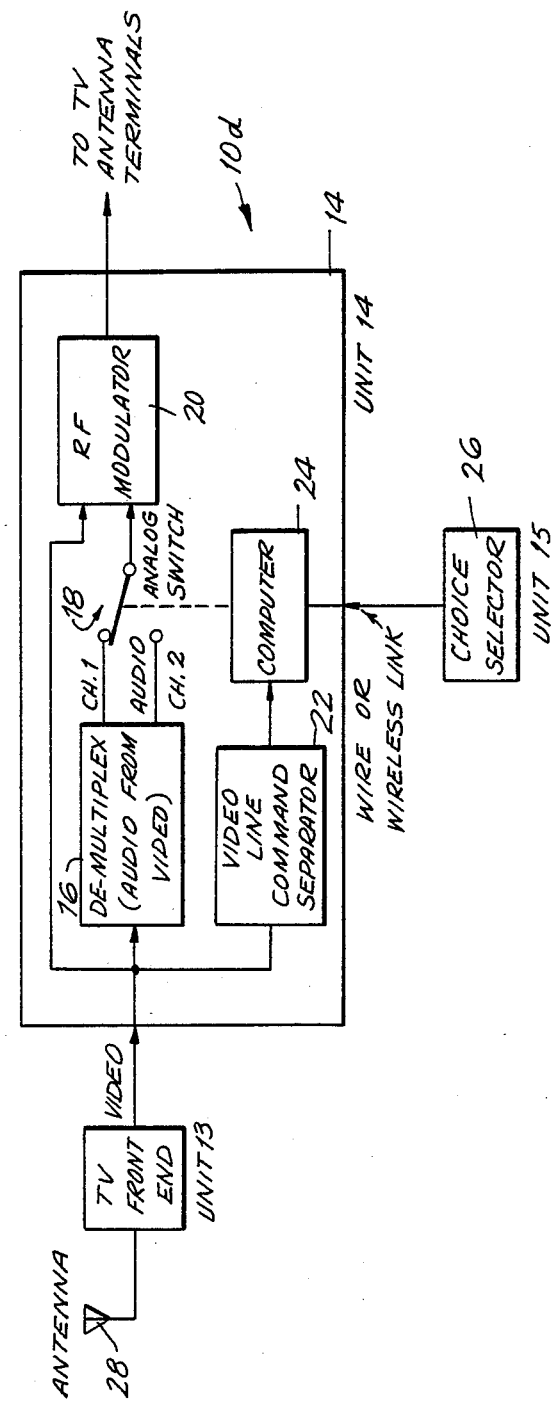
FIG. 5 is a block diagram similar to FIG. 1 in which the television signal is taken off the air with a simplified TV front-end and the received audio multiplexed into the received video line.

Referring now to FIG. 5, the operation of the interactive television system 10d is preferably identical to that previously described with reference to FIG. 3 with the exception that the conventional VCR 12 is replaced with a conventional simplified TV front end tuner 30 which functions in the same manner as the VCR 12 tuner to receive the transmitted television signal and provide it to the control module 14. As with respect to the embodiment of FIG. 3, non-interactive television programming can also be provided in the same manner as accomplished in FIG. 3.

Figure 6:
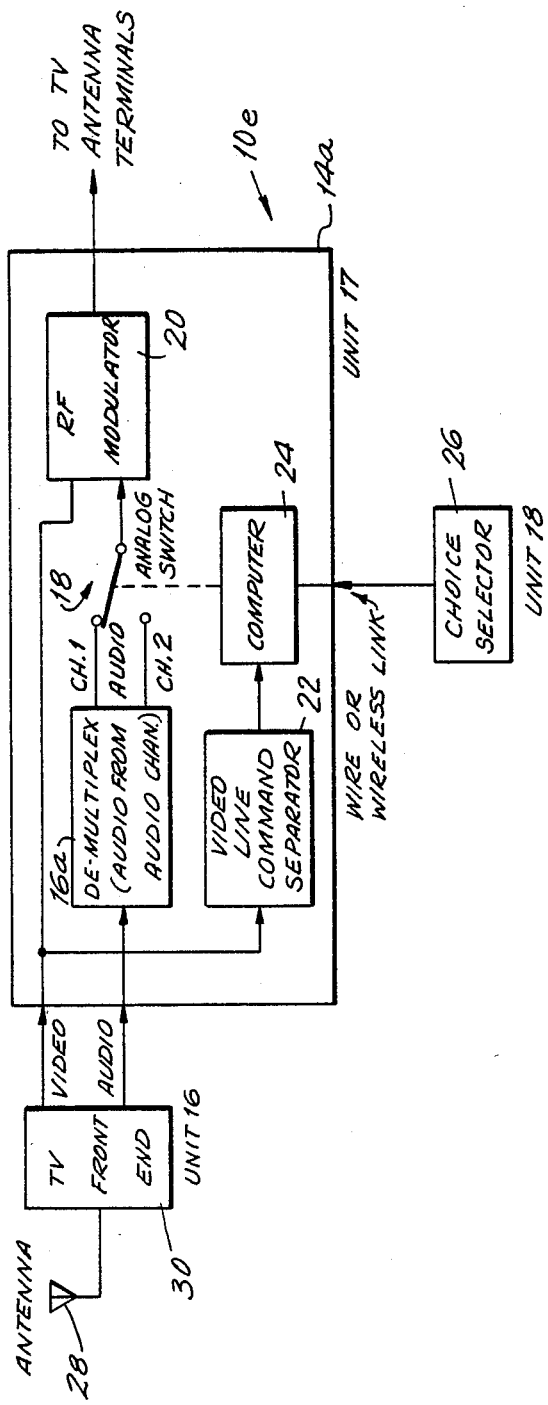
FIG. 6 is a block diagram similar to FIG. 2 in which the television signal is taken off the air with a simplified TV front-end and the received audio multiplexed into the existing audio channel.

Referring now to FIG. 6, the operation of the interactive television system 10e is preferably identical to that previously described with reference to FIG. 4 with the exception that the conventional VCR 12a is replaced by the previously mentioned conventional simplified TV front-end tuner 30 which functions in the same manner as the VCR 12a tuner to receive the transmitted television signal and provide it to the control module 14a. Because the existing audio channel or channels are used, however, as was the case with the embodiment of FIG. 4, non-interactive television programming cannot be provided at the same time.

With respect to the video line command separator 22 present in each of the embodiments of FIGS. 1–6, this circuit is conventional and conventionally extracts one line, such as a line in the range of between line 15 and 22, from the video stream, and extracts the serial data contained therein for processing by the computer 24, which is preferably a conventional 4 bit microprocessor having about 64 bytes of RAM and 2K bytes of ROM, and which conventionally interprets the commands extracted by the video line command separator 22 and the dynamic user selected choices indicated by conventional choice selector 26, which may be a hard wired or wireless link to computer 24, and then conventionally operates analog switch 18 to provide the selected audio signal to the RF modulator 20. By way of example, the serial data encoded commands enable the microprocessor 24 to conventionally accomplish the following tasks or functions: read entry, go to channel defined by last entry, if entry is "x" then make entry "y", if entry is "x" then make entry "y" and go to that channel, store entry at memory "z" go to channel defined by memory "z", other TBD. Of course, although the commands are described, by way of example, as being encoded into the video, they may instead be conventionally encoded into the audio if desired.

Although various conventional techniques for multiplexing the audio channels containing the presently preferred syllable synched audio signals have been described, others may of course be utilized, such as the use of two channels associated with conventional stereo video cassette recorders or the use of two channels associated with a conventional stereo broadcast.

Now that various systems 10–10e have been described for providing the presently preferred interactive television programming, the presently preferred method of recording such programming so as to enable such interactive programming to occur shall be described. Assuming the interactive program is to be recorded live for the first time rather than rerecording a previous non-interactive movie or television show to make it interactive, the video is recorded preferably along with the most likely (or correct choice) portion of the audio first. Assuming the VCR is a conventional "video tape or ¾" video tape machine with two audio channels, this audio portion is preferably recorded on both channels. During the recording, an instant of silence should be provided before and after each branch. After the first recording of the program, the alternate branch or choice should be recorded on the appropriate audio track which will erase or record over the first alternate on that track and replace it with the second such as in the following example:

1. "Hello my friend, I see you answered true. It's a fact that . . .
2. "Hello my friend, I see you answered false."

In the above example, only the word "true" is actually recorded over the first branch choice on the second branch audio channel. Of course, as previously mentioned, a substantially identical syllable count is needed for the second choice if any type of mouth movement is seen in the corresponding video so that both choices appear to be visually the same. In order to do this, the actor who recorded the first choice in the original program should view the replayed video on a studio monitor, for example, and wear headphones in order to hear what was originally recorded. The actor then resays the same line but changes the branch word or phrase while watching the video, such as the phrase "a boy" in the above example. Watching the video will make it easier to sync-up the voice. The actor preferably says the whole line again even though only the branch difference actually gets recorded over the previously recorded first choice on the second branch audio channel. By doing this, it preferably assures that proper pacing and naturalness of voice is achieved. The actor should preferably be in the same position as when the original or first branch was recorded and the microphone should be similarly positioned. This will prevent the tone and timbre of the voice from sounding different. Preferably, the wearing of headphones by the actor insures that no leaking of sound from the branch that was shot first is recorded onto the alternate branch. By simply playing back either of the two audio tracks while watching the video, one can hear and see if the desired result has been achieved. If not, the alternate branch may be rerecorded again. This same approach can be used in recording compatible audio to go with previously recorded movies or television programs that lend themselves to audio synching with the video portions of those programs. In this regard, whether original programming or preexisting programming, certain types of animated characters lend themselves to being programming characters to which the audio synching technique can be readily applied. These characters, by way of example, are puppets, talking animals, animation, voice over segments, people, robots, etc. With respect to people, side shots, moving shots, or wide shots generally work best, as does group singing.

By utilizing a microprocessor 24 in the control module 14, 14a, it can, if desired, not allow changes of channels except when desired, such as from the moment the previous branch ended until a moment before the current branch takes place, it can maintain memory on a branch selection, such as remembering a previous answer and causing it to be subsequently repeated as many times as desired, it can maintain memory on a button selection, it can do logic operations, and it can allow many branches, one right after the other, to create large combinations of output. It can blank out all video and audio if certain requirements are not met (such as receiving less than 80 points on a test or getting less than 6 out of 7 clues correct). Users who exceed these limits could get to see additional programming, such as pay-offs, rewards, or more material, or the system could give remedial instruction to those who need it while the other group sees the end of the program sooner (unbeknown to them). The additional material can be interactive in effect providing a real video branch. But no matter how flexible the microprocessor 24 is, it is still the creation of the script for the interactive program that is important. Parts that are generic must work for both portions of the branch whereas the branches themselves must preferably be as specific as possible. An example of such a script is given below for two audio channels.

| EXAMPLE OF A SCRIPT | |
|---|---|
| POLLY: | Hello I'm Polly the Parrot (a puppet), and this is my sidekick, Professor Bumpers (a person). We would like to ask you 3 questions today. First - are you a boy, or a girl? Press the top button if you're a boy, or the bottom button if you're a girl! Oh, I an see that you're |
| | a boy.          a girl. |
| BUMPERS: | Well, how nice to meet you! May I ask a question now, Polly? |
| POLLY: | Sure - go right ahead! |
| BUMPERS: | Here are 2 numbers: 18 and 9. If you want Polly to subtract them press the middle button; or if you want Polly to multiply them, press the bottom button. Go ahead - press one. |
| | I subtract them and come up with the answer nine. (Note: this answer consists of 12 syllables.) / I multiply and get one-hundred-sixty-two. (Note: this answer also consists of 12 syllables in order to enable the puppet's mouth movements to match both channels of audio.) |
| BUMPERS: | You do great math, Polly! |
| POLLY: | Thanks. Why don't you ask him or her (referring to the camera) another question, Professor Bumpers? (NOTE: Polly's reference to the child's sex is a memory branch, meaning that the child's sex was recalled from memory.) |
| BUMPERS: | I'd love to. Which is the only animal that can make no sound? Here are three choices:<br>(a) giraffe<br>(b) rhinoceros<br>(c) elephant.<br>Answer a, b, or c, now! |
| POLLY: | Well, Bumpers, what's the scoop? I'm anxious to see the answer! (NOTE: The above line of Polly's is delivered while the video is on a two-shot of Polly and the Professor, and remains on the two-shot for the first 3 words of the Professor's next line. After the Professor says "Well, I have" the video cuts to a close-up shot of Polly listening intently.) |
| BUMPERS: | Well, I have (Video cuts to close-up shot of Polly listening.)<br>good news. Our friend picked giraffe and is absolutely correct! / bad news. Our friend picked the wrong answer! Only a giraffe can make no sound. (*No syllable count is necessary during Bumpers' dialogue, since we are not seeing him speaking.) |
| | 1  2  3  4 5 6 |
| POLLY: | Hey,/you/are/ve/ry/smart! |
| | 1    2    3   4  5   6<br>Nice/try,/but/no/ci/gar!<br>(**A syllable count is necessary for Polly's line, since we |

EXAMPLE OF A SCRIPT -continued

|  |  |  |
|---|---|---|
|  |  | are seeing her speaking. Both lines contain 6 syllables as shown.) |
| BUMPERS: | Can we sum up everything our friend did, Polly? (*** All branches following this point are memory branches, meaning the content refers back to an earlier selection made by the child at home.) | |
| POLLY: | Sure! First, our friend told us that | |
|  | he is a <u>boy.</u> Next, he told you that I should <u>subtract</u> the <u>number 9 from 18.</u> | <u>she</u> is a <u>girl.</u> Next, she told you that I should <u>multiply</u> <u>numbers 9 and 18.</u>* (*Each branch has 9 syllables) |
| BUMPERS: | I remember! | |
| POLLY: | And lastly our friend was <u>right by answering</u> <u>the giraffe.</u> | And lastly, our friend was <u>wrong, and that</u> <u>was unfortunate.</u>** (** Each branch has 8 syllables) |
| BUMPERS: | Thanks, Polly. I enjoyed working with our friend at home today, didn't you? | |
| POLLY: | I always enjoy teaching little <u>boys</u> new things. | I always enjoy teaching little <u>girls</u> new things. |
| BUMPERS AND POLLY: | Goodbye, and have a nice day! | |

Thus, by utilizing the present invention, interactive television programming may be provided in which two or more audio channels may be synched to a common video channel, with the video being full motion and full resolution video which is compatible with all audio channels which may be individually selected by the user to provide the full motion audio visual television presentation using dynamic button selection for the choices.

What is claimed is:

1. A television system for providing an interactive full motion synched compatible audio/visual television display presentation based on dynamic user selection of a plurality of choices for a multiple video frame common full motion television display, said system comprising:

means for providing said common full motion multiple video frame television display, said provided common full motion television display comprising a plurality of synched successive video frames, at least one of said successive video frames comprising a common interrogatory message and a plurality of user selectable output choices related to said common interrogatory message, and for providing a plurality of user selectable simulataneously provided audio output presentations corresponding to said user selectable common interrogatory message related choices, said plurality of simultaneously provided audio presentations being synched to and compatible with a subsequent common full motion video frame video presentation in said common full motion television display subsequent to said common interrogatory message containing video frame, said plurality of simultaneously provided user selectable audio output presentations comprising a plurality of simultaneously provided user selectable responsive output messages to said common interrogatory message, said plurality of user selectable responsive output messages having different word content with substantially identical syllable content portions for providing a plurality of simultaneously provided dynamic user selectable syllable synched different responive audio output messages to said previous video frame common interrogatory message in said common full motion television display; and means for dynamically selecting one of said plurality of selectable simultaneously provided syllable synched different responsive output messages from said plurality of user selectable responsive output messages and for providing said subsequent common full motion video frame presentation comprising said common full motion video frame and said dynamic user selected one syllable synched audio presentation compatible therewith for providing said user selectable interactive audio/visual full motion television display over a common television channel; whereby there is no discernable syllable distinction in whichever one of said audio output choices is matched to said common video full motion frame.

2. A television system in accordance with claim 1 wherein said means for providing said common full motion multiple video frame television display and said plurality of simultaneously provided user selectable audio presentation comprises a common storage media for said synched compatible video and audio presentations.

3. A television system in accordance with claim 2 wherein said common storage media comprises a video cassette recording.

4. A television system in accordance with claim 2 wherein said common storage media comprises a video disc recording.

5. A television system in accordance with claim 1 wherein said subsequently provided common full motion video frame video presentations comprises an animated character having mouth movements common to said identical syllable content portions of said plurality of simultaneously provided selectable syllable synched different responsive messages.

6. A television system in accordance with claim 5 wherein said animated character is a puppet.

7. A television system in accordance with claim 5 wherein said animated character is a cartoon animation.

8. A television system in accordance with claim 5 wherein said animated character is a human character.

9. A television system in accordance with claim 2 wherein said subsequently provided common full motion video frame video presentations comprises an animated character having mouth movements common to said identical syllable content portions of said plurality of simultaneously provided selectable syllable synched different responsive messages.

10. A television system in accordance with claim 1 wherein said means for providing said common full motion multiple video frame television display and said plurality of simultaneously provided synched user selectable audio output presentations comprises means for providing said synched user selectable audio output presentations as a multiplexed audio signal, said dynamic selecting means comprising means for demultiplexing said multiplexed audio signal for providing said subsequent common full motion video frame presentation comprising said common full motion video frame and said dynamic user selectable one synched audio output presentation compatible therewith.

11. A television system in accordance with claim 10 wherein said means for providing said video frames comprises means for providing said video frames as a video signal, said means for providing said multiplexed audio signal further comprising means for providing said multiplexed audio signal multiplexed into said video signal.

12. A television system in accordance with claim 11 wherein said means for providing said audio signal multiplexed into said video signal comprises means for pulse amplitude modulating said audio signal with said video signal.

13. A television system in accordance with claim 11 wherein said means for providing said audio signal multiplexed into said video signal comprises means for digitizing said audio signals and inserting said digitized audio signals into an active portion of said video signal.

14. A television system in accordance with claim 10 wherein said means for providing said common full motion multiple video frame television display and said plurality of user selectable audio presentations comprises a common storage media for said synched compatible video and audio output presentations.

15. A television system in accordance with claim 14 wherein said multiplexed audio signal is provided from an existing audio channel of said storage media.

16. A television system in accordance with claim 15 wherein said common storage media comprises a video cassette recording.

17. A television system in accordance with claim 15 wherein said common storage media comprises a video disc recording.

18. A television system in accordance with claim 15 wherein said subsequently provided common full motion video frame video presentations comprises an animated character having mouth movements common to said identical syllable content portions of said plurality of selectable syllable synched different responsive output messages.

19. A television system in accordance with claim 10 wherein said subsequently provided common full motion video frame video presentations comprises an animated character having mouth movements common to said identical syllable content portions of said plurality of selectable syllable synched different responsive output messages.

20. A television system in accordance with claim 1 wherein said means for dynamically selecting one of said plurality of selectable syllable synched different responsive output messages comprises a plurality of selectors greater than the plurality of user selectable choices, a portion of said plurality of selectors being made dynamically common to one of said choices in said plurality of user selectable choices and being dynamically changeable for different common interrogatory messages.

21. A television system in accordance with claim 20 wherein said selectors comprise button selectors.

22. A television system in accordance with claim 20 wherein said means for providing said common full motion multiple video frame television display and said plurality of synched user selectable audio output presentations comprises means for providing said synched user selectable audio output presentations as a multiplexed audio signal, said dynamic selecting means comprising means for demultiplexing said multiplexed audio signal for providing said subsequent common full motion video frame presentation comprising said common full motion video frame and said dynamic user selected one synched audio output presentation compatible therewith.

23. A television system in accordance with claim 22 wherein said means for providing said video frames comprises means for providing said video frames as a video signal, said means for providing said multiplexed audio signal further comprising means for providing said multiplexed audio signal multiplexed into said video signal.

24. A television system in accordance with claim 23 wherein said means for providing said audio signal multiplexed into said video signal comprises means for pulse amplitude modulating said audio signal with said video signal.

25. A television system in accordance with claim 23 wherein said means for providing said audio signal multiplexed into said video signal comprises means for digitizing said audio signals and inserting said digitized audio signals into an active portion of said video signal.

26. A television system in accordance with claim 11 wherein said means for providing said common full motion multiple video frame television display further comprises means for providing an additional audio signal synched to and compatible with said video signal successive video frame for providing a subsequent common full motion audio/visual video frame presentation absent said dynamic selection by said user.

27. A television system in accordance with claim 1 wherein said provided common full motion video frame provides a user selectable full motion and full resolution audio/visual television display.

28. A television system in accordace with claim 11 wherein said means for providing said audio sigal multiplexed into said video signal comprises means for pulse duration modulating said audio signal with said video signal.

29. A television system in accordance with claim 23 wherein said means for providing said audio signal multiplexed into said video signal comprises means fot pulse duration modulating said audio signal with said video signal.

* * * * *

UNITED STATES PATENT AND TRADEMARK OFFICE
CERTIFICATE OF CORRECTION

PATENT NO. : 4,847,698

DATED : July 11, 1989

INVENTOR(S) : MICHAEL J. FREEMAN

It is certified that error appears in the above-identified patent and that said Letters Patent is hereby corrected as shown below:

Column 1, line 35: After "systems", delete the comma (,).

Column 1, line 65: Change "per se" to --*per se*--.

Column 2, line 6: Change "signal" to --signals--.

Column 7, line 8: Change "true" to --*true*--.

Column 7, line 10: Change "false" to --*false*--.

Column 8, line 54: After "giraffe", insert a comma (,).

Column 9, line 17: Change "*was right*" to --was *right*--.

Column 9, line 53: Amendment dated Dec. 19, 1988; change "simulataneously" to --simultaneously--.

Column 10, line 3: Change "responive" to --responsive--.

UNITED STATES PATENT AND TRADEMARK OFFICE
CERTIFICATE OF CORRECTION

PATENT NO. : 4,847,698

DATED : July 11, 1989

INVENTOR(S) : MICHAEL J. FREEMAN

It is certified that error appears in the above-identified patent and that said Letters Patent is hereby corrected as shown below:

Column 10, line 18: Amendment dated Dec. 19, 1988; change "discernable" to --discernible--.

Column 11, line 22: Amendment dated Dec. 19, 1988; after "audio", insert --output--.

Column 12, line 48: Change "sigal" to --signal--.

Signed and Sealed this

Fifth Day of May, 1992

*Attest:*

DOUGLAS B. COMER

*Attesting Officer*  Acting Commissioner of Patents and Trademarks